United States Patent
Menon et al.

(10) Patent No.: US 11,586,802 B2
(45) Date of Patent: Feb. 21, 2023

(54) PARAMETERIZED STATES FOR CUSTOMIZED VIEWS OF RESOURCES

(71) Applicant: Palantir Technologies Inc., Denver, CO (US)

(72) Inventors: Parvathy Menon, San Jose, CA (US); Adam Borochoff, New York, NY (US); Hao Zuo, New York, NY (US); Joseph Rafidi, Mountain View, CA (US); Kamran Khan, London (GB); Ryan Rowe, Portola Valley, CA (US); Salar Al Khafaji, Amsterdam (NL); Tyler Uhlenkamp, New York, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 17/209,703

(22) Filed: Mar. 23, 2021

(65) Prior Publication Data

US 2021/0209288 A1    Jul. 8, 2021

Related U.S. Application Data

(63) Continuation of application No. 16/143,054, filed on Sep. 26, 2018, now Pat. No. 10,956,654.

(Continued)

(51) Int. Cl.
*G06F 40/106* (2020.01)
*G06F 40/197* (2020.01)
(Continued)

(52) U.S. Cl.
CPC ........ *G06F 40/106* (2020.01); *G06F 3/04847* (2013.01); *G06F 40/197* (2020.01); *G06F 40/18* (2020.01)

(58) Field of Classification Search
CPC ..................................................... G06F 3/147
See application file for complete search history.

(56) References Cited

U.S. PATENT DOCUMENTS

| 6,701,311 B2 | 3/2004 | Biebesheimer et al. |
| 8,788,681 B1 | 7/2014 | MacKay |

(Continued)

FOREIGN PATENT DOCUMENTS

| EP | 2608018 A1 | 6/2013 |
| WO | 2009139965 A2 | 11/2009 |

OTHER PUBLICATIONS

Extended European Search Report for EP Appln. No. 19183375.5 dated Oct. 4, 2019, 10 pages.

(Continued)

*Primary Examiner* — James J Debrow
(74) *Attorney, Agent, or Firm* — Sheppard Mullin Richter & Hampton LLP

(57) ABSTRACT

Systems, methods, and non-transitory computer readable media are provided for providing parameterized states. Resource customization information may be obtained. The resource customization information may identify a resource and define a customized view of the resource. A parameterized state may be generated based on the resource customization information. Activation of the parameterized state may cause the customized view of the resource to be presented. An interface through which the parameterized state is accessible may be provided.

20 Claims, 6 Drawing Sheets

Related U.S. Application Data

(60) Provisional application No. 62/692,103, filed on Jun. 29, 2018.

(51) Int. Cl.
    *G06F 3/04847*    (2022.01)
    *G06F 40/18*      (2020.01)

(56) References Cited

U.S. PATENT DOCUMENTS

| | | | |
|---|---|---|---|
| 9,354,939 | B2 | 5/2016 | Ferris et al. |
| 2002/0107842 | A1* | 8/2002 | Biebesheimer et al. .. G06F 7/00 |
| 2004/0019600 | A1 | 1/2004 | Charlet |
| 2013/0042007 | A1 | 2/2013 | Linton et al. |
| 2014/0165134 | A1* | 6/2014 | Goldschlag et al. ... G06F 21/60 |
| 2015/0036185 | A1* | 2/2015 | Asai ......................... H04N 1/00 |
| 2020/0152181 | A1* | 5/2020 | Woo et al. ............ G10L 15/183 |

OTHER PUBLICATIONS

Official Communication for European Patent Application No. 18201487.8 dated Jan. 9, 2019.

Yuan Yuan et al: "A secure service discovery protocol for manet", Personal, Indoor and Mobile Radio Communications, 2003. PIMRC 2003. 14th IEEE Proceedings on Sep. 7-10, 2003, vol. 1, Jan. 1, 2003 (Jan. 1, 2003), pp. 502-506, XP055532855, Piscataway, NJ, USA, ISBN: 978-0-7803-7822-3.

\* cited by examiner

PARAMETERIZED STATES FOR CUSTOMIZED VIEWS OF RESOURCES

CROSS REFERENCE TO RELATED APPLICATIONS

This application is a continuation of U.S. application Ser. No. 16/143,054, filed Sep. 25, 2018, now U.S. Pat. No. 10,956,654, which claims the benefit under 35 U.S.C. § 119(e) of U.S. Provisional Application Ser. No. 62/692,103, filed Jun. 29, 2018, the content of each of which is incorporated by reference in its entirety into the present disclosure.

FIELD OF THE INVENTION

This disclosure relates to approaches for providing parameterized states.

BACKGROUND

Under conventional approaches, a user may manually operate on a resource to generate a customized view of the resource. For example, a user may change parameters of a reporting application to change the dataset used by the reporting application and/or the type of report(s) provided by the reporting application. The user may share the customized view of the resource by providing screenshot(s) of the customized view. Such sharing of the customized view of the resource may be computationally intensive/inefficient and may not allow others to easily generate/use the customized view of the resource.

SUMMARY

Various embodiments of the present disclosure may include systems, methods, and non-transitory computer readable media configured to provide parameterized states. Resource customization information may be obtained. The resource customization information may identify a resource and define a customized view of the resource. A parameterized state may be generated based on the resource customization information. Activation of the parameterized state may cause the customized view of the resource to be presented. An interface through which the parameterized state is accessible may be provided.

In some embodiments, the resource may include a data set, a project, a file, or an application.

In some embodiments, the resource may be associated with an application. The resource customization information defining the customized view of the resource may include the resource customization information defining one or more parameters used by the application to present a view of the resource.

In some embodiments, the resource customization information may further identify a portion of the resource. The activation of the parameterized state may cause the customized view of the portion of the resource to be presented.

In some embodiments, a presentation of the parameterized state may include a preview of the resource. For example, the preview of the resource may include a preview of the customized view of the resource.

In some embodiments, the generation or the activation of the parameterized state may be tracked to provide a usage summary for the resource.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
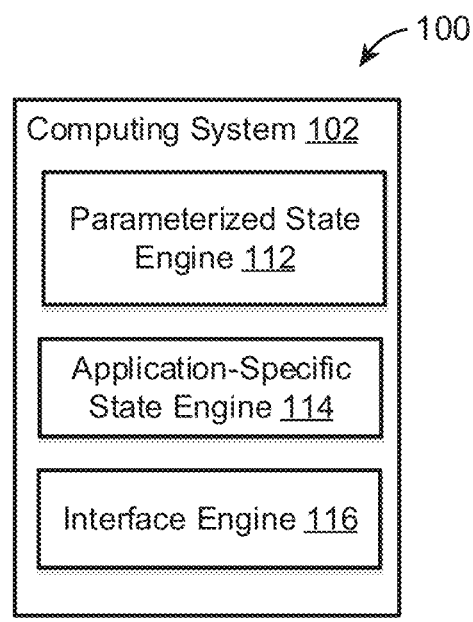
FIG. 1 illustrates an example environment for providing parameterized states, in accordance with various embodiments.

A claimed solution rooted in computer technology overcomes problems specifically arising in the realm of computer technology. In various implementations, a computing system is configured to provide parameterized states. Resource customization information may be obtained. The resource customization information may identify a resource, such as a data set, a project, a file, or an application. The resource customization information may define a customized view of the resource. A parameterized state may be generated based on the resource customization information. Activation of the parameterized state may cause the customized view of the resource to be presented. An interface through which the parameterized state is accessible may be provided.

In some embodiments, the resource may be associated with an application, and the resource customization information defining the customized view of the resource may include the resource customization information defining one or more parameters used by the application to present a view of the resource. For example, the resource may be associated with a particular application (e.g., reporting application), and the resource customization information may define one or more parameters used by the particular application to determine what data will be used as inputs to the application, what will be outputted by the application, and/or how the application will present outputs. The customized view of the resource may include the application running within a specific state. That is, the parameterized state may enable the application to start in a specific state based on the passing of parameter(s) (inputs) to the application to be used on start.

In some embodiments, the resource customization information may identify a portion of the resource, and the activation of the parameterized state may cause the customized view of the portion of the resource to be presented. For example, the resource may include a document (e.g., spreadsheet) and the resource customization information may identify a portion of the document (e.g., column(s), row(s), worksheet(s)). The activation of the parameterized state may cause the customized view of the portion of the document to be presented.

In some embodiments, a presentation of the parameterized state may include a preview of the resource. That is, rather than simply presenting a label (e.g., name) of the parameterized state, the presentation of the parameterized state may include a visualization of the parameterized state that makes the associated resource more evident. For instance, the preview of the resource may include a preview of the customized view of the resource.

In some embodiments, the generation and/or the activation of the parameterized state may be tracked to provide a usage summary for the resource. For instance, the generation of parameterized states may be tracked to determine how many users have (e.g., created, shared, have available) parameterized states to particular resources. The activation of parameterized states may be tracked to determine how many users have used particular resources and/or how often particular resources have been used.

The approaches disclosed herein enable generation and provision of parameterized states for use in viewing customized views of resources. Rather than sharing a static view (e.g., screenshots) of a resource and/or manually configuring individual computing devices to present a particular view of a resource, a parameterized state may be created and shared among multiple users to enable individual users to quickly and easily access customized views of resources. For example, an administrative user (e.g., manager) may set up parameterized states to be used by different users and/or user group. An individual user may set up parameterized states for personal use and/or for sharing with other users. The generation and/or sharing of parameterized states may be monitor to determine how the resources are being used and/or whether the resources are being used properly.

FIG. 1 illustrates an example environment 100 for providing parameterized states, in accordance with various embodiments. The example environment 100 may include a computing system 102. The computing system 102 may include one or more processors and memory. The processor(s) may be configured to perform various operations by interpreting machine-readable instructions stored in the memory. The environment 100 may also include one or more datastores that are accessible to the computing system 102 (e.g., via one or more network(s)). In some embodiments, the datastore(s) may include various databases, application functionalities, application/data packages, and/or other data that are available for download, installation, and/or execution.

In various embodiments, the computing system 102 may include a parameterized state engine 112, an application-specific state engine 114, an interface engine 116, and/or other engines. While the computing system 102 is shown in FIG. 1 as a single entity, this is merely for ease of reference and is not meant to be limiting. One or more components/functionalities of the computing system 102 described herein may be implemented, in whole or in part, within a single computing device or within multiple computing devices.

In various embodiments, the parameterized state engine 112 is configured to obtain resource customization information. Obtaining resource customization information may include accessing, acquiring, analyzing, determining, examining, identifying, loading, locating, opening, receiving, retrieving, reviewing, storing, and/or otherwise obtaining the resource customization information. Resource customization information may be obtained from one or more storage locations. A storage location may refer to electronic storage located within the computing system 102 (e.g., integral and/or removable memory of the computing system 102), electronic storage coupled to the computing system 102, and/or electronic storage located remotely from the computing system 102 (e.g., electronic storage accessible to the computing system 102 through a network). Resource customization information may be obtained from one or more databases. Resource customization information may be stored within a single file or across multiple files. For example, resource customization information have been ingested into a database as one or more objects, and the parameterized state engine 112 may retrieve the object(s) to obtain the resource customization information.

In some embodiments, the parameterized state engine 112 may obtain resource customization information on a user's interaction with a user interface. The user interface may enable a user to define the resource customization information obtained by the parameterized state engine 112. For example, the user interface may provide one or more tools by which the user may browse through one or more resources for selection. For instance, the user interface may provide a browser tool via which a user may browse through data catalog, projects, recent files, favorite resources, shared resources, and/or other file/application for selection. The user interface may provide one or more tools by which the user may define one or more parameters used to present the resource. As another example, the user interface may provide one or more views of a resource and may provide one or more tools by which the user may "export" the view(s) of the resource. The resource information may be defined by the resource (or portion of the resource) presented within the user interface and one or more parameters that are used to present the resource within the user interface. Other selection of resource customization information to be obtained by the parameterized state engine 112 are contemplated.

Resource customization information may identify a resource and/or other information. A resource may refer to physical and/or virtual component available for use by a user and/or a computing system (e.g., the computing system 102). A resource may refer to one or more collection of information and/or one or more tools for operating on information. For instance, a resource may include a data set, a project, a file, or an application. The resource customization information may identify a particular resource, such as by including a resource identifier corresponding to the particular resource. In some embodiments, the resource customization information may further identify a portion of the resource. That is, in addition to including information that identifies a particular resource, the resource customization information may include information that identifies a particular portion of the resource. For example, the resource may include a document (e.g., spreadsheet) and the resource customization information may identify a portion of the document (e.g., column(s), row(s), worksheet(s)). Such identification of the resource and/or portion of a resource by the resource customization information may enable the computing system 102 to generate a parameterized state for the resource/the portion of the resource.

The resource customization information may define a customized view of the resource and/or a portion of the resource. A customized view of a resource/a portion of the resource may refer to a view of the resource/the portion of the resource which has been modified. For example, a customized view of a resource may include a view of the resource which has been modified by a user to present one or more particular aspects of the resource. For instance, the resource may be associated with an application. That is, the resource may be used (e.g., presented, modified, transformed) using a particular application, and the resource customization information defining a customized view of the resource may include the resource customization information defining one or more parameters used by the particular application to present a view of the resource. For example, a resource may be associated with a reporting application, and the resource customization information may define one or more parameters used by reporting application to determine what data (e.g., portion of the resource, other resources) will be used as inputs to the reporting application, what will be outputted by the reporting application, and/or how the reporting application will present its outputs. The resource customization information including information on the customized view of the resource may enable the computing system 102 to generate a parameterized state for the resource/the portion of the resource.

In various embodiments, the application-specific state engine 114 is configured to generate a parameterized state based on the resource customization information and/or other information. The parameterized state may be specific to an application, and the application-specific engine 114 may generate parameterized states which may be presented by the application. The parameterized state may be generated such that activation of the parameterized state causes the customized view of the resource and/or the portion of the resource to be presented. The parametrized state may be generated and/or activated via one or more plugins. For example, a plugin for an application may enable the use of the parameterized state by the application. The parameterized state may include a link to the resource and/or the portion of the resource. The parameterized state may define the customized view of the resource/portion of the resource. For example, the link to the resource/portion of the resource may include commands that define a customized view of the resource/portion of the resource. For instance, the application-specific state engine 114 may generate a parameterized state for a portion of a document, such as particular column(s), row(s), and/or worksheet(s) within a spreadsheet. The parameterized state for the portion of the document may include information that defines a customized view of the portion of the document and activation of the parameterized state may cause the customized view of the particular column(s), row(s), and/or worksheet(s) or a customized view of the data contained within the particular column(s), row(s), and/or worksheet(s) to be presented. As another example, a parameterized state may identify a dataset as the resource and the resource may be associated with an application. The parameterized state may define one or more parameters to be passed to the application such that when the parameterized state is activated, the application used the passed parameter(s) to present a customized view of the resource.

In some embodiments, a customized view of a resource may include the application running within a specific state. That is, the parameterized state may enable the application to start in a specific state based on the passing of parameter(s) (inputs) to the application to be used on start. The application may require certain values/parameters to start in a specific state and that parameterized state may include values/parameters to be provided to the application so that the application may start in the specific state (e.g., with the provided values/parameters). Such passing of values/parameters into an application may enable users of different proficiency to use various tools/capabilities provided by the application. For example, it may take a user who is very proficient in an application to change the settings for the application and/or to enable a particular tool/capability of the application for use. For instance, it may take a user who is well-versed in the workings of a reporting application to change how the reporting application takes in data as input, how the application manipulates the inputs, and/or how the application presents the outputs (e.g., in table form, in a chart form, in a summary form). It may be time consuming for such a user to manually change how individual reporting applications are running across multiple computing devices. Rather than manually changing the state in which individual reporting application run in different computing devices, a parameterized state that prompts the reporting application to start in a particular state may be shared among multiple users/computing devices to enable the users to utilize the reporting application in the desired state.

In various embodiments, the interface engine 116 is configured to provide one or more interfaces through which a parameterized state is accessible. The interface(s) may include application program interface(s) (APIs) and/or user interface(s). For example, the interface engine 116 may provide (e.g., make available for use, supply) one or more APIs that may be used by users/computing systems to access (e.g., activate, identify, load, open, retrieve, view) a parameterized state. As another example, the interface engine 118 may provide (e.g., generate, present) one or more user interfaces (e.g., web user interface accessible through a browser) through which users may access a parameterized state.

The interface(s) provided by the interface engine 116 may enable presentation of a parameterized state in one or more user interfaces. In some embodiments, a presentation of the parameterized state may include a preview of a resource and/or a preview of a portion of the resource. That is, rather than presenting a textual description of the parameterized state, such as a label/name of the parameterized state, or the associated resource/portion of the resource, the presentation of the parameterized state may include a visualization of the parameterized state that makes the associated resource more evident. For instance, a presentation of the parameterized state effectuated through the interface(s) provided by the interface engine 116 may include a visual representation of the customized view of the resource/portion of the resource which is presented based on activation of the parameterized state. For example, a presentation of the parameterized state may include a preview of the resource/portion of the resource and/or a preview of the customized view of the resource/portion of the resource.

In some embodiments, the generation and/or the activation of the parameterized state may be tracked to provide a usage summary for the resource/portion of the resource. For instance, the generation of parameterized states may be tracked to determine how many users have parameterized states to particular resources. The user's possession of a parameterized state may be further categorized based on how the user came to have the parameterized state, such as whether the user created the parameterized state, whether the user was shared a parameterized state, and/or otherwise have the parameterized state available. The users' other usages of a parameterized state, such as sharing of the parameterized state with other users and/or modification of the parameterized state, may also be tracked to provide usage summary. The activation of parameterized states may be tracked to determine how many users have used particular resources/portions of resources and/or how often/number of times particular resources/portions of resources have been used. For instance, the activation of parameterized states may be tracked to determine how users are using a resource/portion of the resource, how different users/user groups are using resources/portions of resources differently (e.g., using different parameters), how different users/user groups have changed parameters of parameterized states, and/or how users/user groups are otherwise using the resources/portions of resources made available by the parameterized states.

The generation and/or activation of parameterized states may also be used to determine whether users/user groups are using correct parameters for the resources/portions of resources. In some embodiments, one or more parameters for resources (e.g., parameters for applications that utilize the resources) may be provided to users for use via the parameterized states. For example, different settings for an application may be provided to different users/user groups via different parameterized states and/or different policies (e.g., permissions) may be provided for a single resource to different users/user groups via different parameterized states. That is, different parameterized states may be generated with different settings/policies for sharing with different users/user groups.

FIGS. 2, 3A, 3B, and 4 illustrate example user interfaces 200, 300, 350, 400 in accordance with various embodiments. In various embodiments, the user interfaces 200, 300, 350, 400 may be accessed through a software application running on a computing device (e.g., computers, mobile phones, tablets, etc.) that includes one or more processors and memory. For example, the user interfaces 200, 300, 350, 400 may be accessible through a web browser. In another example, the user interfaces 200, 300, 350, 400 may be provided through a data analysis application. In yet another example, the user interfaces 200, 300, 350, 400 may be provided as a service over a network (e.g., software as a service). Depending on the computing device, the user may be able to interact with the user interfaces 200, 300, 350, 400 using various input devices (e.g., keyboard, mouse, etc.) and/or touch/gestures. The user interfaces 200, 300, 350, 400 are provided merely as examples and, naturally, the arrangement and configuration of such user interfaces can vary depending on the implementation. Thus, depending on the implementation, the user interfaces 200, 300, 350, 400 may include additional features and/or alternative features. The user interfaces 200, 300, 350, 400 may include/enable one or more functionalities of the interface(s) described above with respect to the computing system 102/components of the computing system 102.

Figure 2:
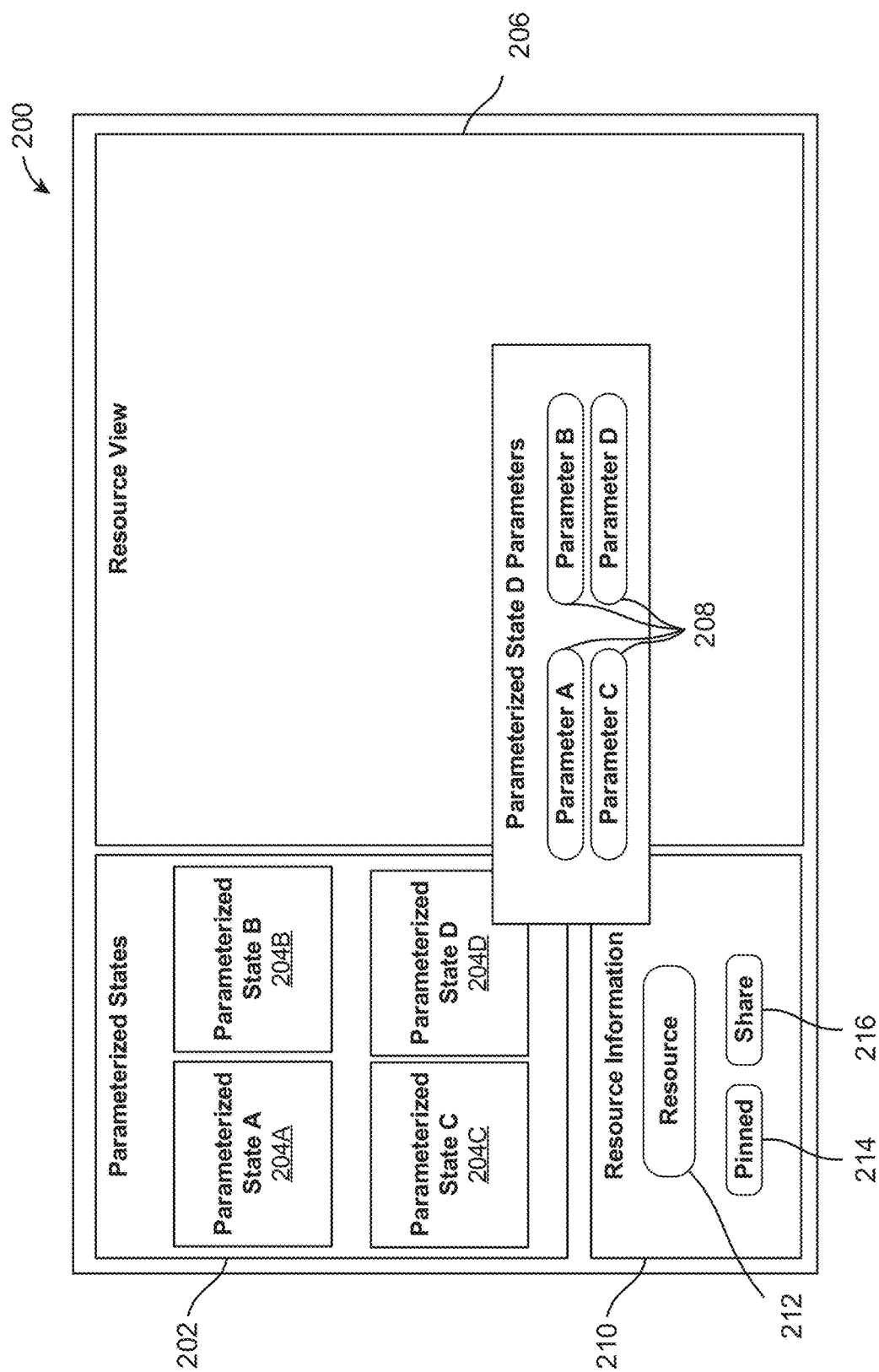
FIG. 2 illustrates an example interface for providing parameterized states, in accordance with various embodiments.

FIG. 2 illustrates an example interface 200 for providing parameterized states, in accordance with various embodiments. The interface 200 may include a parameterized states section 202, a resource view section 206, a parameter section 208, and a resource information section 210. The parameterized states sections 202 may provide a view (e.g., listing) of available parameterized states. For example, the parameterized states section 202 may provide visual representations (e.g., icon, previews) of a parameterized state A 204A, a parameterized state B 204B, a parameterized state C 204C, and a parameterized state D 204D.

The resource view section 206 may provide a view of a resource. The resource view section 206 may provide a view of a portion of a resource. For example, the resource selected for viewing/use may include a document and the resource section 206 may provide a view of the document and/or a portion of the document. As another example, the resource selected for viewing/use may include a portion of a dataset and the resource section 206 may provide a visualization of the dataset using one or more applications. In some embodiments, a user may interact with one or more application to change the view of the resource. For example, a user may change one or more parameters of the application to change how the application uses the selected resource and/or how the outputs of the application may be visualized. The resource information section 210 may provide information on a selected resource. For instance, the resource field 212 may provide information on the identified of a selected resource. The pinned field 214 may provide information on whether the selected resource has been pinned within a parameterized state. That is, the pinned field 214 may information on whether a parameterized state has been generated for the selected resource. The user may use the pinned field 214 to either create a parameterized state for the selected resource (e.g., pin the resource as a parameterized state) or to remove a parameterized state for the selected resource (e.g., unpin a parameterized state for the resource).

The share field 216 may enable a user to share the selected resource using a parameterized state. That is, activation of the share field 216 may prompt the user interface 200 to present one or more options by which a parameterized state for the resource may be generated and/or shared with one or more users. For example, the user interface 200 may present one or more options by which the user may select one or more parameters to be passed to an application that uses the resource and by which a customized view of the resource may be generated/presented. In some embodiments, the parameter(s) for a resource may be auto-populated based on how the user is using the resource. For example, the user may have interacted with an application for the resource to create a customized view of the resource within the resource view section 206. The parameter(s) set by the user to create the customized view of the resource within the resource view section 206 may be used to generate a parameterized state for the resource. Such generation of a parameterized state for the resource may provide a dynamic snapshot of the resource. That is, rather than simply providing a screenshot of a particular view of the resource, the parameterized state may include and/or effectuate parameters for the application/resource such that the same view of the resource may be dynamically created based on activation of the parameterized state.

The interface 200 may include one or more options to change a parameterized state. For example, the parameterized state section 202 may include one or more options to add a parameterized state, remove a parameterized state, and/or rearrange parameterized states. As another example, the parameterized states section 202 may include one or more options to change the listed parameterized states. For instance, individual representations of parameterized states 204A, 204B, 204C, 204D may include one or more options to change the corresponding parameterized states. For example, based on activation of such a change option for the parameterized state D 204D, the parameter section 208 may be presented. The parameter section 208 may display parameters 208 associated with the resource and/or the application that utilizes the resource. A user may interact with one or more of the parameters 208 to set, change, remove, and/or otherwise modify the parameters 208.

Figure 3:
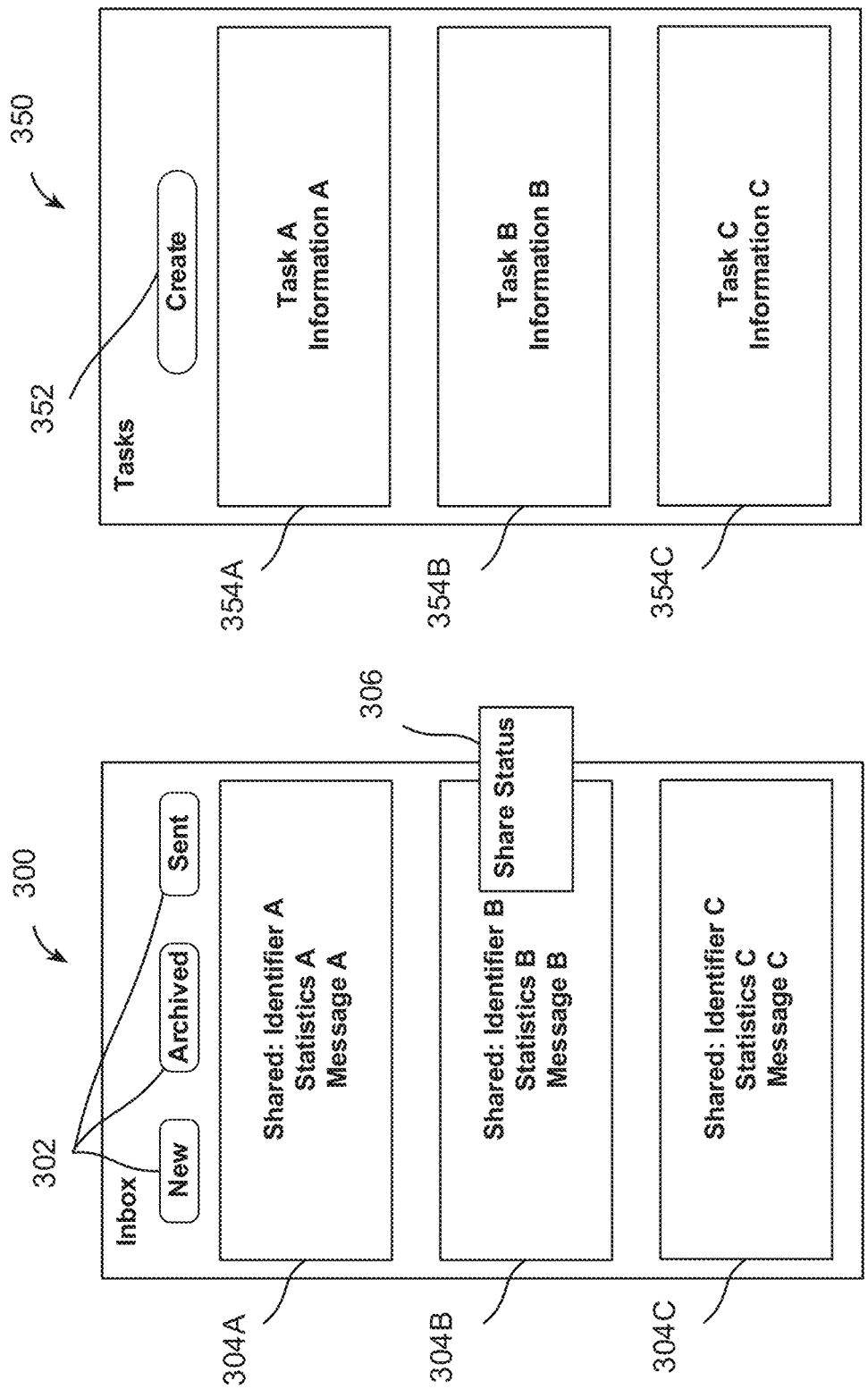
FIG. 3A illustrates an example inbox interface for parameterized states, in accordance with various embodiments.
FIG. 3B illustrates an example tasks interface for parameterized states, in accordance with various embodiments.

FIG. 3A illustrates an example inbox interface 300 for parameterized states, in accordance with various embodiments. The inbox interface 300 may provide information relating to sharing of parameterized states. For example, a user may share a parameterized state via one or more messages sent via the inbox interface 300. The inbox interface 300 may include options 302 that enables a user to change the types of message (e.g., new messages, archived messages, sent messages) displayed within the inbox interface 300. For example, the inbox interface 300 may display information boxes 304A, 304B, 304C on three parameterized states that have been shared by a user. The information boxes 304A, 304B, 304C may include information on the identifier (e.g., name) of the shared parameterized state and/or the shared resource, information on statistics relating to the parameterized state (e.g., when the parameterized state was generated, shared, and/or used, with how many people the parameterized state was shared), information on message that accompanied the sharing of the parameterized state, and/or other information relating to the shared parameterized state.

The information boxes 304A, 304B, 304C may include dynamic and/or static information relating to the parameterized states. For example, responsive to a user's selection of the information box 304B, the share status of the corresponding parameterized state may be displayed within a share status box 306. The share status box 306 may display information relating to specific user(s) that have been shared the parameterized state. For example, the share status box 306 may display names/identifiers of user(s) who received the parameterized state, whether individual users have seen the parameterized state, whether individual users have activated the parameterized state, whether individual users have pinned the parameterized state (e.g., to a particular desktop location, to a browser location, to an interface), whether individual users have shared the parameterized state, whether individual users have archived the parameterized state, whether individual users have changed the parameterized state, and/or whether individual users have otherwise interacted with the parameterized state.

FIG. 3B illustrates an example tasks interface 350 for parameterized states, in accordance with various embodiments. The tasks interface 350 may provide information relating to tasks to be performed relating to parameterized states. A task relating to a parameterized state may refer to work to be performed relating to the parameterized state. For example, a task relating to a parameterized state may refer to work to be performed relating to generation, modification, use, and/or sharing of the parameterized state. For example, the task interface 350 may display information boxes 354A, 354B, 354C on three tasks to be performed by a user relating to one or more parameterized states. The information boxes 354A, 354B, 354C may include information on the identifier (e.g., name) of the task, parameterized state, and/or the shared resource, information on the task to be performed, the status of task to be performed, and/or other information. A user may create a task to be listed within the task interface 350 by using the create option 352. A user may send a task to other user(s).

Figure 4:
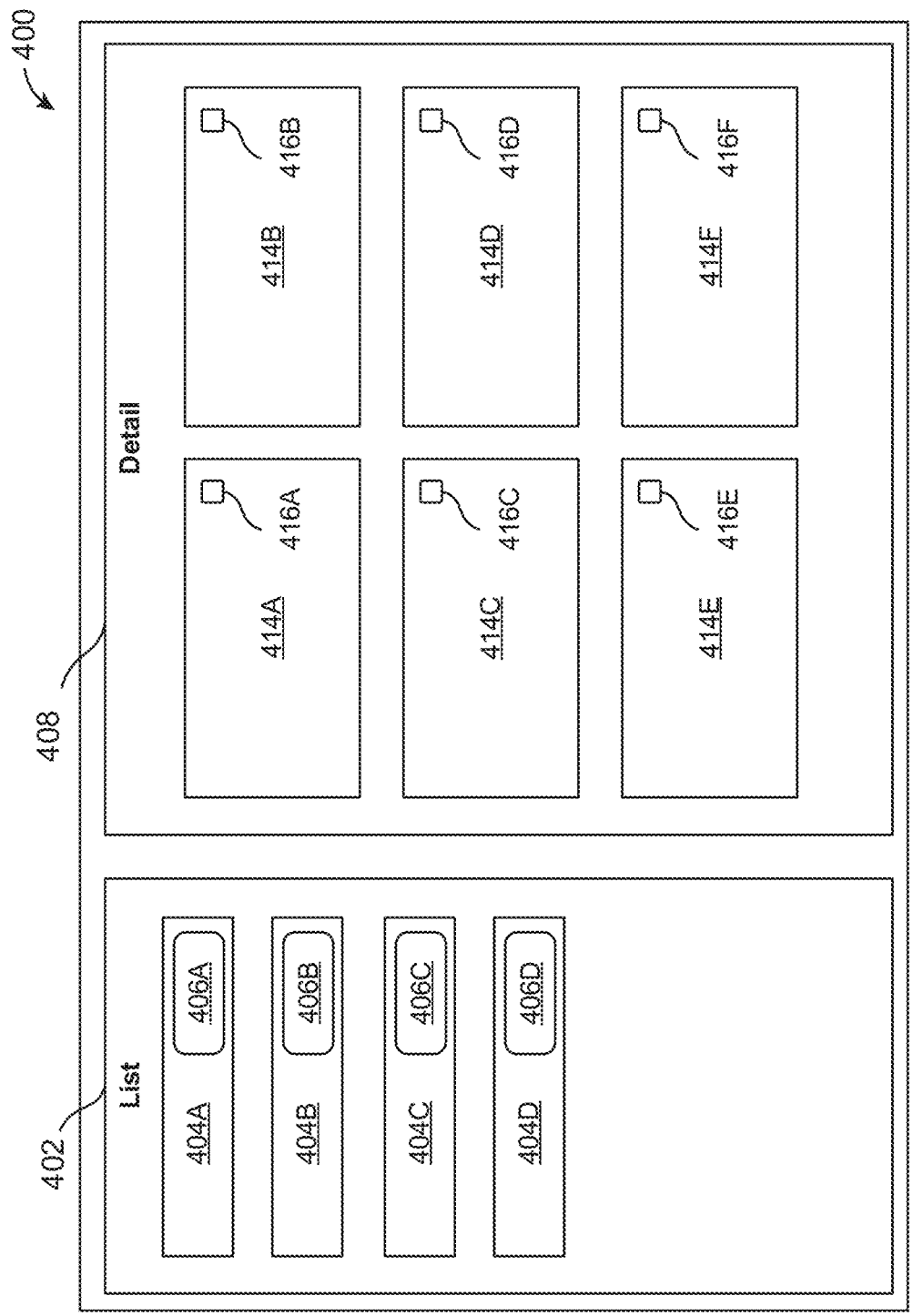
FIG. 4 illustrates an example interface for managing parameterized states, in accordance with various embodiments.

FIG. 4 illustrates an example management interface 400 for managing parameterized states, in accordance with various embodiments. The management interface 400 may include a list section 402 and a detail section 408. The list section 402 may include a list of resources, a list of parameterized states, a list of users, a list of user groups, a list of organizations, and/or other list(s). The detail section 408 may provide information relating to things listed within the list section 402. A user may use the management interface 400 to manage use of parameterized states for different resources and/or different users. In some embodiments, access to the management interface 400 be limited to one or more users or one or more groups of users, such as administrative users and/or a group of managers.

For example, the list section 402 may list resources for which parameterized states may be generated. For instance, boxes 404A, 404B, 404C, 404D may represent four different resources. The boxes 404A, 404B, 404C, 404D may include information that identifies the respective resources. The boxes 404A, 404B, 404C, 404D may include other information relating to the respective resources. For example, the boxes 404A, 404B, 404C, 404D may include fields 406A, 406B, 406C, 406D that list the number of parameterized states for the respective resources, the number of users who have used the respective resources, the number of users who have parameterized states for the respective resources, the number of users who have used parameterized states for the respective resources, and/or other information.

A user may select one of the boxes 404A, 404B, 404C, 404D to view information relating to the selected box in the detail section 408. For example, responsive to a user's selection of the box 404A, which represents a resource, the detail section 408 may show boxes 414A, 414B, 414C, 414D, 414E, 414F. Individual boxes 414A, 414B, 414C, 414D, 414E, 414F may represent and/or show information relating to objects related to the resource represented by the box 404A. For example, the boxes 414A, 414B, 414C, 414D, 414E, 414F may represent and/or show information relating to parameterized states which have been generated for the resource. As another example, the boxes 414A, 414B, 414C, 414D, 414E, 414F may represent and/or show information relating to users and/or user groups who have used the resource, who have parameterized states for the resource, and/or who have used parameterized states for the resource. The boxes 414A, 414B, 414C, 414D, 414E, 414F may include options 416A, 416B, 416C, 416D, 416E, 416F to change the respective parameterized state and/or the respective user/user group. For example, in the case that the box 414A represents a parameterized state for the resource, a user may use the option 416A to change one or more parameters for the parameterized state. As another example, in the case that the box 414A represents a user group, a user may use the option 416A to change the composition of the user group and/or characteristics (e.g., access privilege) of the user group.

As another example, the list section 402 may list resources for users and/or user groups. For instance, boxes 404A, 404B, 404C, 404D may represent four different users/user groups. The boxes 404A, 404B, 404C, 404D may include information that identifies the respective user/user group. The boxes 404A, 404B, 404C, 404D may include other information relating to the respective user/user group. For example, the boxes 404A, 404B, 404C, 404D may include fields 406A, 406B, 406C, 406D that list the number of parameterized states pinned by/for the user/user group, the number of resources for which the user/user group has parameterized states, and/or other information.

A user may select one of the boxes 404A, 404B, 404C, 404D to view information relating to the selected box in the detail section 408. For example, responsive to a user's selection of the box 404A, which represents a user group, the detail section 408 may show boxes 414A, 414B, 414C, 414D, 414E, 414F. Individual boxes 414A, 414B, 414C, 414D, 414E, 414F may represent and/or show information relating to objects related to the user group represented by the box 404A. For example, the boxes 414A, 414B, 414C, 414D, 414E, 414F may represent and/or show information relating to parameterized states which have been pinned by/for the user group. As another example, the boxes 414A, 414B, 414C, 414D, 414E, 414F may represent and/or show information relating to resources for which the user/user group has parameterized states. The boxes 414A, 414B, 414C, 414D, 414E, 414F may include options 416A, 416B, 416C, 416D, 416E, 416F to change the respective parameterized state and/or the respective resource. For example, in the case that the box 414A represents a parameterized state for a resource, a user may use the option 416A to change one or more parameters for the parameterized state. As another example, in the case that the box 414A represents a resource, a user may use the option 416A to change the parameterized states for the resource.

A user may user the management interface 400 to manage parameterized states for multiple users and/or user groups. For example, a user may use a search option in the management interface 400 to search for parameterized states (e.g., by name, corresponding resource, corresponding application, metadata, user, user group, pipeline) and add one or more of the parameterized states to a user and/or a user group. As another example, a user may use the management interface 400 to see the lists parameterized states pinned by users/user groups, pin parameterized states to different users/user groups, import/export parameterized states from/to users/user groups, modify parameterized states for different users/user groups, and/or otherwise manage use of parameterized states by different users/user groups. As yet another example, a user may user the management interface 400 to determine which customized views are used by different users/user groups and make sure that the customized views are maintained (e.g., the customized views are available and accurate after system migration, update, and/or transfer). As further example, a user may use the management interface 400 to see the parameterized states used, generated, and/or shared by another user and copy the other user's parameterized states. Other uses of the management interface 400 are contemplated.

Figure 5:
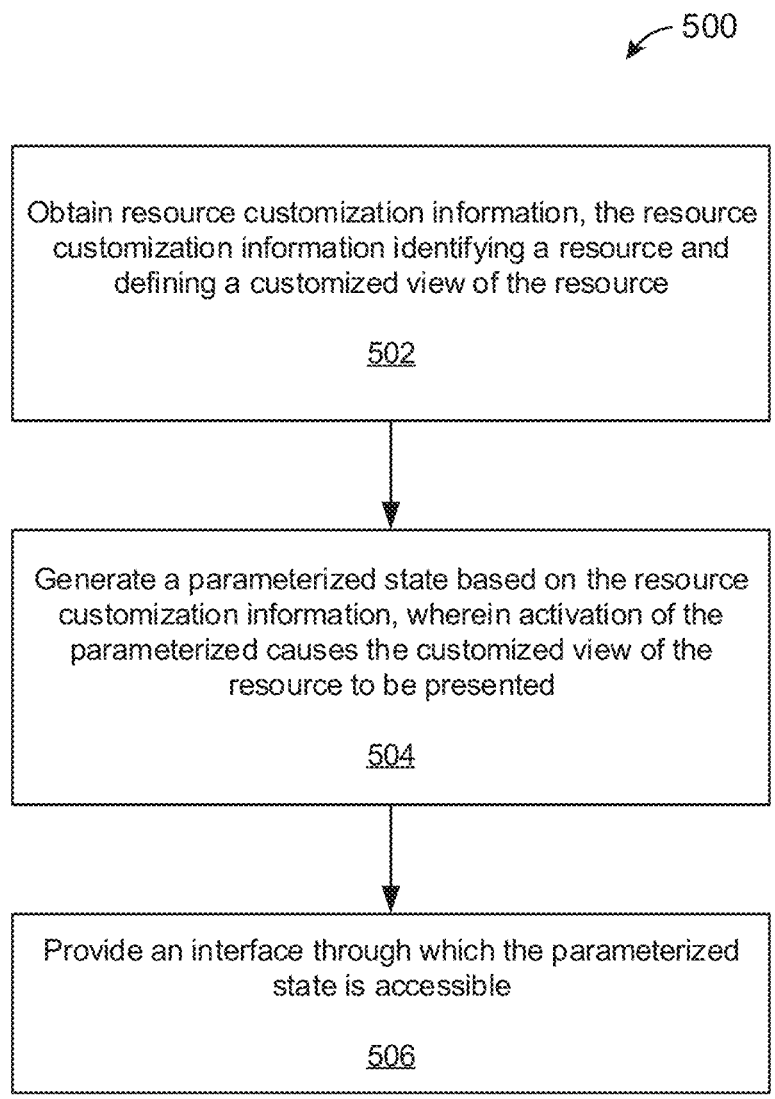
FIG. 5 illustrates a flowchart of an example method, in accordance with various embodiments.

FIG. 5 illustrates a flowchart of an example method 500, according to various embodiments of the present disclosure. The method 500 may be implemented in various environments including, for example, the environment 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, resource customization information may be obtained. The resource customization information may identify a resource and define a customized view of the resource. At block 504, a parameterized state may be generated based on the resource customization information. Activation of the parameterized state may cause the customized view of the resource to be presented. At block 506, an interface through which the parameterized state is accessible may be provided.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
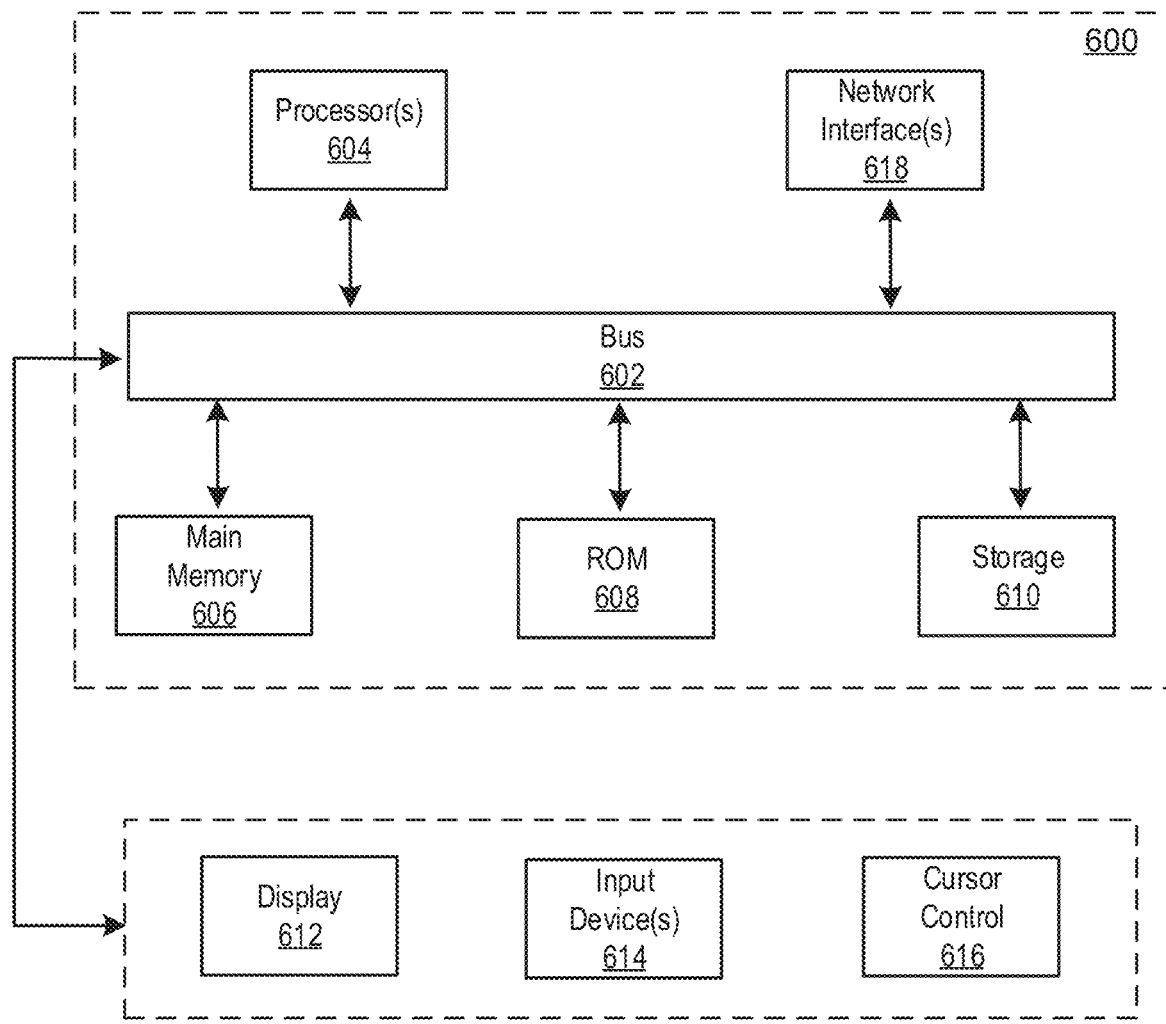
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a stand-alone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors; and
a memory storing instructions that, when executed by the one or more processors, cause the system to perform:
providing a first interface within a user interface through which a parameter within a parameterized state associated with a resource is selected;
providing, in response to a selection of a parameter, a second interface within the user interface through which a visualization of the resource is provided;
detecting a utilization mode of the resource and an interaction with an application for the resource; and
generating parameterized states for the application based on the utilization mode, the interaction, and the selection, wherein the parameterized states indicate access permissions or access policies of the resource associated with different devices; and
presenting the respective parameterized states on at least a subset of the different devices, wherein at least two of the different devices are associated with different access permissions or access policies with respect to the resource, the resource comprising a data set, a project, or a file, and the presenting comprises:
presenting a first portion of the data set, the project, or the file on a first device having first access permissions or first access policies with respect to the data set, the project, or the file and a second portion of the data set, the project, or the file on a second device having second access permissions or second access policies with respect to the data set, the project, or the file.

2. The system of claim 1, wherein the instructions further cause the system to perform:
selectively permitting a user to modify a generated parameterized state based on an access control level of the user.

3. The system of claim 1, wherein the parameter associated with the resource provides one or more corresponding previews of the resource through the first interface.

4. The system of claim 1, wherein the first interface permits setting, changing, and removing the parameter.

5. The system of claim 1, wherein the generating of the parameterized states is in response to detecting a mode of visualization of the resource.

6. The system of claim 1, wherein the parameterized state specifies a particular state in which the application starts; and the instructions further cause the system to perform:
transmitting parameterized states corresponding to the parameterized state to an other device, wherein a particular parameterized state of the parameterized states is activated on the other device based on an access policy corresponding to the other device;
tracking, by the system, a mode of utilization of the particular parameterized state on the other device and whether or not the other device has modified the particular parameterized state; and
displaying information of the mode of utilization and whether or not the other device has modified the particular parameterized state on the first interface.

7. The system of claim 1, wherein the parameterized state indicates any two parameters, wherein each parameter indicates one of:
types of data that are compatible with the application,
a mode or manner in which the application analyzes the data, or
formats outputted by the application.

8. The system of claim 1, further comprising a plugin that activates the parameterized state.

9. The system of claim 1, wherein the presenting of the first portion of the data set, the project, or the file comprises selecting a particular organization of the first portion based on the utilization mode and the interaction.

10. The system of claim 1, wherein the particular organization comprises a tabular, a chart, or a summary format.

11. The system of claim 1, wherein the instructions that, when executed by the one or more processors, cause the system to perform:
determining that a third device has the first access permissions or the first access policies; and
transmitting the first portion of the data set, the project, or the file to the third device.

12. The system of claim 1, wherein the instructions that, when executed by the one or more processors, cause the system to perform:
determining that a fourth device has third access permissions or third access policies distinct from the first access permissions or the first access policies, and from the second access permissions or the second access policies;
generating a new parameterized state for the resource corresponding to the third access permissions or the third access policies; and
transmitting the new parameterized state to the fourth device.

13. The system of claim 1, wherein the instructions that, when executed by the one or more processors, cause the system to perform:
providing a third interface within the user interface through which visual representations of the parameterized states are provided; and wherein the first interface indicates whether a different device has modified a parameterized state following transmission of the parameterized state.

14. The system of claim 1, wherein the instructions that, when executed by the one or more processors, cause the system to perform:
removing a parameterized state for the resource.

15. The system of claim 1, wherein the instructions that, when executed by the one or more processors, cause the system to perform:

maintaining the respective parameterized states following a system migration or a system update.

16. A method implemented by a computing system including one or more processors and a storage media storing machine-readable instructions, wherein the method is performed using the one or more processors, the method comprising:
   providing a first interface within a user interface through which a parameter within a parameterized state associated with a resource is selected;
   providing, in response to a selection of a parameter, a second interface within the user interface through which a visualization of the resource is provided;
   detecting a utilization mode of the resource and an interaction with an application for the resource; and
   generating parameterized states for the application based on the utilization mode, the interaction, and the selection, wherein the parameterized states indicate access permissions or access policies of the resource associated with different devices; and
   presenting the respective parameterized states on at least a subset of the different devices, wherein at least two of the different devices are associated with different access permissions or access policies with respect to the resource, the resource comprising a data set, a project, or a file, and the presenting comprises:
      presenting a first portion of the data set, the project, or the file on a first device having first access permissions or first access policies with respect to the data set, the project, or the file and a second portion of the data set, the project, or the file on a second device having second access permissions or second access policies with respect to the data set, the project, or the file.

17. The method of claim 16, wherein the first interface is provided through a data analysis application.

18. The method of claim 16, wherein the parameter associated with the resource provides one or more corresponding previews of the resource through the first interface.

19. The method of claim 16, wherein the first interface permits setting, changing, and removing the parameter.

20. A non-transitory computer readable medium comprising instructions that, when executed, cause one or more processors to perform:
   providing a first interface within a user interface through which a parameter within a parameterized state associated with a resource is selected;
   providing, in response to a selection of a parameter, a second interface within the user interface through which a visualization of the resource is provided;
   detecting a utilization mode of the resource and an interaction with an application for the resource; and
   generating parameterized states for the application based on the utilization mode, the interaction, and the selection, wherein the parameterized states indicate access permissions or access policies of the resource associated with different devices; and
   presenting the respective parameterized states on at least a subset of the different devices, wherein at least two of the different devices are associated with different access permissions or access policies with respect to the resource, the resource comprising a data set, a project, or a file, and the presenting comprises:
      presenting a first portion of the data set, the project, or the file on a first device having first access permissions or first access policies with respect to the data set, the project, or the file and a second portion of the data set, the project, or the file on a second device having second access permissions or second access policies with respect to the data set, the project, or the file.

* * * * *